United States Patent
Mahdi et al.

(10) Patent No.: US 9,920,199 B2
(45) Date of Patent: Mar. 20, 2018

(54) SILYL TERMINATED PREPOLYMERS, METHOD FOR MAKING THEM AND ADHESIVE COMPOSITIONS MADE THEREFROM

(71) Applicant: Dow Global Technologies LLC, Midland, MI (US)

(72) Inventors: Syed Z. Mahdi, Rochester Hills, MI (US); Yiyong He, Midland, MI (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 124 days.

(21) Appl. No.: 14/835,761

(22) Filed: Aug. 26, 2015

(65) Prior Publication Data

US 2016/0060382 A1 Mar. 3, 2016

Related U.S. Application Data

(60) Provisional application No. 62/044,449, filed on Sep. 2, 2014.

(51) Int. Cl.
*C08L 75/08* (2006.01)
*C08G 18/10* (2006.01)

(52) U.S. Cl.
CPC ............. *C08L 75/08* (2013.01); *C08G 18/10* (2013.01)

(58) Field of Classification Search
CPC ................................ C08L 75/08; C08G 18/10
See application file for complete search history.

(56) References Cited

U.S. PATENT DOCUMENTS

| | | |
|---|---|---|
| 3,632,557 A | 1/1972 | Brode et al. |
| 3,971,751 A | 7/1976 | Isayama et al. |
| 4,625,012 A | 11/1986 | Rizk et al. |
| 6,355,127 B1 | 3/2002 | Mahdi et al. |
| 7,482,420 B2 | 1/2009 | Porsch et al. |
| 8,501,903 B2 | 8/2013 | Zander et al. |
| 2006/0183845 A1* | 8/2006 | Harada .............. C08G 18/0823 524/588 |
| 2011/0306723 A1 | 12/2011 | Choffat |

FOREIGN PATENT DOCUMENTS

| | | |
|---|---|---|
| EP | 0931800 B1 | 7/1999 |
| WO | 2012003187 | 1/2012 |
| WO | 2012003212 | 1/2012 |
| WO | 2012003216 A1 | 1/2012 |

OTHER PUBLICATIONS

Lab Book No. AH2012203360-13.

* cited by examiner

*Primary Examiner* — Patrick Niland
(74) *Attorney, Agent, or Firm* — The Dobrusin Law Firm, P.C.

(57) ABSTRACT

An improved silane modified polymer useful in adhesive compositions is made from a silane precursor material made by a process comprising reacting an organic compound having a backbone that is terminated by an amino group having at least one active amino hydrogen and a hydrolysable silane, wherein the backbone is comprised of at least one secondary amino group having one active amino hydrogen and a Michael addition acceptor compound, wherein the Michael addition compound fails to have a group reactive with an isocyanate group to form the silane precursor compound. The silane precursor compound is reacted with an isocyanate terminated polyurethane prepolymer to form a silane modified prepolymer. The silane modified prepolymer may then be cured with moisture and may be employed in an adhesive composition containing other components such as a plasticizer, catalyst and filler.

20 Claims, No Drawings

SILYL TERMINATED PREPOLYMERS, METHOD FOR MAKING THEM AND ADHESIVE COMPOSITIONS MADE THEREFROM

FIELD OF INVENTION

The invention relates to silyl terminated prepolymers useful in adhesives for bonding glass. In particular, the invention is useful to bond glass into vehicles and buildings.

BACKGROUND OF INVENTION

In automobile factories, windows are installed using robots and computer controlled processing which facilitates the use of a variety of high performance adhesives, for instance, nonconductive adhesives and high modulus adhesives. These adhesives have to be storage stable and be readily applied under high shear, for example, to a windshield, while retaining the bead shape so that the windshield can be properly fitted to the automobile. This typically has been achieved by one part moisture curable polyurethane prepolymer based adhesives having fillers, with the prepolymers having sufficient molecular weight, so that they are still pumpable and can be applied to the windshield without sagging or stringing in the time it takes to place the windshield on the automobile. These adhesives contain free isocyanate groups that are regulated and will be subject to more stringent regulation.

Silane modified polymers (SMPs) have been used to replace the moisture curable polyurethane based adhesives. SMPs generally are comprised of flexible polymeric backbones that are terminated by moisture reactive (hydrolysable) silane terminal groups. SMPs, generally, have been made by three routes. The first, illustrated by U.S. Pat. No. 3,971,751, involves hydrosilylating a silicon hydride having hydrolysable silyl groups with an allyl terminated polyether, where the allyl terminated polyether was formed from a polyether polyol. Unfortunately, these SMPs tend to be expensive due to the cost to fabricate the allyl terminated polyether due to the use of chlorine and alkali that must be removed and disposed. The second, illustrated by U.S. Pat. No. 3,632,557, generally involves reacting an aminosilane with an isocyanate terminated prepolymer resulting in trialkoxysilyl end groups with polyether polymer backbones containing urea linkages. Adhesives with these prepolymers tend to have high viscosities and low elongation. The third, illustrated by U.S. Pat. Nos. 4,625,012 and 6,355,127 involves reacting an isocyanato organosilane with a polyurethane having terminal active hydrogens. Likewise, these have suffered from high viscosities and low elongations.

Recently, PCT Appl. Nos. WO2012/003212, WO2012/003216, and WO2012/003187 have described hydrosilylating a silicon hydride having hydrolysable silyl groups with an allyl terminated polyether, where the polyether has only one allyl terminal group and the other terminal group is an alcohol. After hydrosilylation, the terminal alcohol is reacted with a diisocyanate resulting in urethane linkage and isocyanate terminal group. This is then reacted with a polyether polyol to form SMPs.

Each of the above have suffered from complex and expensive processes to make a moisture curable SMP useful for an adhesive composition.

What is needed is a SMP composition that is useful as an adhesive for bonding glass into a structure avoiding some of shortcomings they have exhibited such as those described above.

SUMMARY OF INVENTION

A first aspect of the invention is a method of making a silane precursor compound useful to make a silane modified prepolymer comprising:

a) providing an organic compound having a backbone that is terminated by an amino group having at least one active amino hydrogen and a hydrolysable silane, wherein the backbone is comprised of at least one secondary amino group having one active amino hydrogen, b) providing a Michael addition acceptor compound, wherein the Michael addition compound fails to have a group reactive with an isocyanate group, and c) reacting the organic compound with the Michael addition acceptor compound to form the silane precursor compound, the silane precursor compound having one tertiary amino group and one secondary amino group. It has been surprisingly found that a prepolymer having excellent compatibility with plasticizer may be made by reacting secondary amino groups in the silane precursor such that a prepolymer made from it is more compatible with typical plasticizers used in sealants and adhesives such as esters.

A second aspect of this invention is an adhesive composition comprised of a silicon modified prepolymer comprised of a formula:

$$Q\text{-}(L)_z$$

wherein Q is a residue of an isocyanate terminated polyether prepolymer having a valency of z, z being equal to 2 or 3, and L being independently,

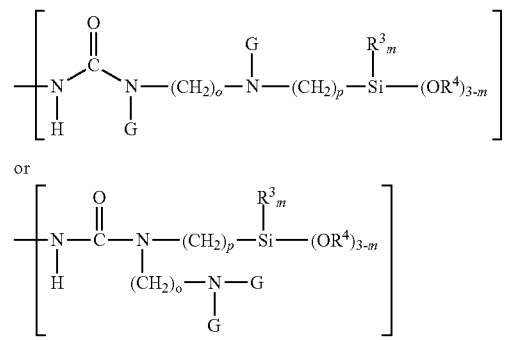

wherein G is an alkyl ester having 3 to 10 carbons, $R^3$ is a linear or branched alkyl having 1 to 6 carbon atoms, $R^4$ is a linear or branched alkyl having 1 to 4 carbon atoms and m is equal to 0, 1 or 2. o and p are identical or different and equal to 2 to 6.

A variety of substrates may be bonded together using an adhesive composition comprised of a silane terminated prepolymer formed by the method of the invention. Examples include plastics, glass, wood, ceramics, metal, coated substrates, such as plastics with an abrasion resistant coating disposed thereon, and the like. The compositions of the invention may be used to bond similar and dissimilar substrates together. The compositions are especially useful for bonding glass or a plastic with an abrasion resistant coating disposed thereon to other substrates such as vehicles and buildings. The compositions of the invention are also useful in bonding parts of modular components together, such as vehicle modular components. The glass or plastic with an abrasion resistant coating disposed thereon can be bonded to coated and uncoated portions of vehicles.

It has been surprisingly discovered that the adhesive composition of the invention may have improved, compatibility elongation, sag and adhesion compared to other SMP adhesive compositions particularly when used with a plasticizer. It is not understood why, but without being limiting in any way, it is believed that the enhanced plasticizer compatibility may be due to a greater amount of alkyl esters being incorporated in the silane modified prepolymer of this invention, which may allow more desirable rheological properties particularly when mixed with a filler.

DETAILED DESCRIPTION OF INVENTION

To make the silane modified prepolymer, a silane precursor compound is first made. In the method to make the precursor an organic compound having a backbone that is terminated by an amino group having at least one active amino hydrogen and a hydrolysable silane, wherein the backbone is comprised of at least one secondary amino group having one active amino hydrogen is reacted by Michael addition with a Michael addition acceptor compound, wherein the Michael addition acceptor compound fails to have a group reactive with an isocyanate group. In the method at least one secondary amino group is reacted by Michael addition with the Michael addition acceptor compound.

Desirably, the organic compound is one that is represented by the structure:

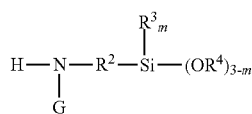

where G is an organic group or hydrogen, $R^2$ is $-(CH_2)_O-NH-(CH_2)_P-$, in which o and p are identical or different and equal to 2 to 6, $R^3$ is a linear or branched alkyl residue having 1 to 6 carbon atoms, $R^4$ is a linear or branched alkyl residue having 1 to 4 carbon atoms and m is equal to 0, 1 or 2. Preferably, m is 1 or 2 and more preferably 1. G preferably is hydrogen or an organic group having at most 10 carbons or more preferably is hydrogen or a linear or branched alkyl residue having 1 to 6 carbon atoms.

Examples of the organic compound include N(beta-aminoethyl) gamma aminopropylmethyldimethoxy-silane (available under the tradename SILQUEST 2120 from Momentive Performance Materials Inc. Columbus, Ohio) and N(beta-aminoethyl) gamma aminopropyltriethoxy-silane also available from Momentive under the tradename SILQUEST 1120.

The Michael addition acceptor compound may be any that reacts with the primary or secondary amine group of the organic compound through a Michael addition reaction such as alkyl acrylate. Desirably, the Michael addition compound is one that is represented by the structure:

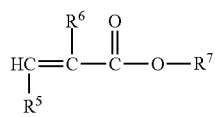

wherein $R^5$ and $R^6$ are independently a hydrogen or a methyl group, $R^7$ is a linear or branched alkyl residue having 1 to 6 carbon atoms. Preferably $R^7$ is a linear or branched alkyl having 1 to 3 carbons. Preferably, $R^5$ and $R^6$ are hydrogen. Exemplary Michael addition compounds include methyl acrylate, ethyl acrylate, propyl acrylate, n-butyl acrylate, isobutyl acrylate, tert-butyl acrylate, pentyl acrylate or hexyl acrylate.

The organic compound is reacted under conditions and stoichiometries such that each amino hydrogen has been reacted except for one, which means at least one secondary amine has undergone a Michael addition reaction to form a tertiary amine in forming the silane precursor compound having one tertiary amino group and one secondary amino group. Generally, the reaction temperature is at least room temperature (~23° C.) to at most about 70° C. Typically, the reaction does not require any heating from room temperature. The time may be any time practical and may range from several minutes to several hours. The amount of Michael addition compound is provided in an amount that is sufficient to react with all of the amino hydrogens except one on each molecule and may be provided in slight excess. Thus if the organic compound has an average of 3 amino hydrogens, the Michael addition acceptor compound would be provided in an amount of 2 moles per 3 moles of amino hydrogens in the organic compound. The reaction also is performed under dry or inert atmospheres to avoid hydrolysis of the silane terminal groups.

The silane precursor compound may then be reacted with an isocyanate terminated precursor prepolymer ("isocyanate terminated prepolymer") to form a silyl silane modified polymer comprising reacting the silane precursor compound with a polyisocyanate compound, which typically is an isocyanated terminated prepolymer, but may be a polyisocyanate monomer or oligomer. The isocyanate terminated prepolymer generally has about 0.8 percent by weight or greater free isocyanate based on the weight of the prepolymer. Preferably, the amount of free isocyanate is about 0.9 percent by weight or greater to about 4.0 percent by weight or less, more preferably about 3.5 or less, even more preferably about 3.0 percent by weight or less, and even more preferably about 2.6 percent by weight or less of free isocyanate. Above 4.0 percent by weight, the adhesives prepared from the prepolymer may demonstrate lap shear strengths after 60 minutes that may be too low for the intended use. Below about 0.8 percent by weight, the prepolymer viscosity may be too high to allow for effective pumping of the silane modified polymer that is formed.

The isocyanate terminated prepolymer generally exhibits a viscosity that is about 100,000 centipoise (100 Pa s) or less and more preferably about 50,000 centipoise (50 Pa s) or less, and most preferably about 30,000 centipoise (30 Pa s) or less and about 1,000 centipoise (1 Pa s) or greater. The viscosity used herein is Brookfield viscosity determined using a number 5 spindle. The viscosity of the adhesive can be adjusted with fillers, although the fillers generally do not improve the green strength of the final adhesive. Below about 1,000 centipoise (1 Pa s), the adhesive prepared from the prepolymer may exhibit poor green strength. Above about 100,000 centipoise (100 Pa s), the prepolymer may be unstable and hard to dispense.

Preferable polyisocyanates for use in preparing the isocyanate terminated prepolymer include those disclosed in U.S. Pat. No. 5,922,809 at column 3, line 32 to column 4, line 24, incorporated herein by reference. Preferably, the polyisocyanate is an aromatic or cycloaliphatic polyisocyanate such as diphenylmethane-4,4'-diisocyanate, isophorone diisocyanate, tetramethylxylene diisocyanate, and is most preferably diphenylmethane-4,4'-diisocyanate. The diols and triols are generically referred to as polyols.

The isocyanate terminated prepolymers are made from polyols such as diols and triols corresponding to the polyols described in U.S. Pat. No. 5,922,809 at column 4, line 60 to column 5, line 50, incorporated herein by reference. The polyols (diols and triols) are polyether polyols and more preferably polyoxyalkylene oxide polyols. The most preferred triols are ethylene oxide-capped polyols prepared by reacting glycerin with propylene oxide, followed by reacting the product with ethylene oxide. Preferably, the polyether is chosen to decrease the polarity of the prepolymer. A significant factor in determining the polarity of the prepolymer is the amount of ethylene oxide units in the polyether used to prepare the isocyanate terminated prepolymer. Preferably, the ethylene oxide content in the prepolymer is about 3 percent by weight or less, more preferably about 1.2 percent by weight or less and most preferably about 0.8 percent by weight or less. As used herein "polarity" refers to the impact of the presence of polar groups in the backbone of the prepolymer. It is also understood that a small amount of other polyols may be used to form the isocyanate terminated prepolymer such as a polyester polyol, including, for example, those known in the art. Typically, such other polyols may be present in an amount of about up to 5% by weight of the polyols used to make said prepolymer. However, said prepolymer may be made in the absence of such polyols.

The polyols are present in an amount sufficient to react with most of the isocyanate groups of the isocyanates leaving enough isocyanate groups to correspond with the desired free isocyanate content of the isocyanate terminated prepolymer. Preferably, the polyols are present in an amount of about 30 percent by weight or greater based on the prepolymer, more preferably about 40 percent by weight or greater and most preferably about 55 percent by weight or greater. Preferably, the polyols are present in an amount of about 75 percent by weight or less based on the prepolymer, more preferably about 65 percent by weight or less and most preferably about 60 percent by weight or less.

Generally, it is preferred that the isocyanate terminated prepolymer is linear (i.e., formed from diols), but may be formed using diols or triols or higher order polyols to enhance crosslinking of the adhesive composition. The weight ratio of diol to triol when triols are present is about 0.8 or greater and more preferably about 0.85 or greater and most preferably about 0.9 or greater to about 0.98.

The isocyanate terminated prepolymers have a number average molecular weight of 4,000 to about 60,000 g/mole. The "molecular weight average" used herein is the number average molecular weight ($M_n$) as defined on page 189 of Textbook of Polymer Science $3^{rd}$ Edition, Billmeyer, F. W. Jr., John Wiley and Sons, NY, NY, 1984. Desirably, the $M_n$ average may be at least: 6,000; 8,000; 10,000; and 15,000 to at most about 50,000 or about 40,000.

The isocyanate prepolymer may be prepared by any suitable method, such as reacting the aforementioned polyols with an excess over stoichiometry of the polyisocyanates under reaction conditions sufficient to form a prepolymer having isocyanate functionality and free isocyanate content described above. Illustrative processes for the preparation of the isocyanate prepolymers are disclosed in U.S. Pat. No. 5,922,809 at column 9, lines 4 to 51.

The reaction of the OH terminated polyoxyalkylene with the isocyanate terminated prepolymer to form the silane modified polymer is generally carried out under an excess amount of silane precursor compound is used to ensure all the NCO of the isocyanate terminated prepolymer has been reacted with secondary amino hydrogen. Typically, the molar excess of amino H to NCO is 1.01, 1.02 or 1.05 to 1.2, 1.15 or 1.1. Generally, the NCO is fully reacted when no NCO is detected by using Karl Fisher titration or no NCO peak is detected by infrared spectroscopy such as Fourier Transform infrared spectroscopy (FTIR).

Generally, the time is as short as practicable such as several minutes to 24 hours or several hours. Typically, the temperature is at least about 20, 30, 40, 50 to about 100, 80, or 70° C. The atmosphere may be any suitable so long as it is sufficiently dry to essentially avoid reaction of the isocyanate with water. Generally, the atmosphere used may be vacuum, dry air, inert gas, including nitrogen or combination thereof.

The silane modified prepolymer is preferably linear, but may be branched as described for the isocyanate terminated prepolymer. The silane modified prepolymer may have a molecular weight average between 8,000 to about 80,000 g/mole. The "molecular weight average" used in this paragraph is the number average molecular ($M_n$) as defined on page 189 of Textbook of Polymer Science, $3^{rd}$ Edition, Billmeyer, F. W. Jr., John Wiley and Sons, NY, NY, 1984. Desirably, the $M_n$ average is at least in ascending desirability: 20,000, 30,000, 40,000, 50,000 and 55,000 to at most about 70,000 or even at most about 65,000.

The silane modified prepolymer generally exhibits a viscosity that is about 100,000 centipoise (100 Pa s) or less and more preferably about 50,000 centipoise (50 Pa s) or less, and most preferably about 30,000 centipoise (30 Pa s) or less and about 1,000 centipoise (1 Pa s) or greater. The viscosity used herein is Brookfield viscosity determined using a number 6 spindle. The viscosity of the adhesive can be adjusted with fillers, although the fillers generally do not improve the green strength of the final adhesive. Below about 1,000 centipoise (1 Pa s), the adhesive prepared from the prepolymer may exhibit poor green strength. Above about 100,000 centipoise (100 Pa s), the prepolymer may be unstable, hard to dispense or gel.

When the silane modified prepolymer is used in an adhesive composition it may also be comprised of a filler and a catalyst. The filler may be any fillers suitable for use in adhesive compositions such as those known in the art. Illustratively, the filler may be a hydrophilic, hydrophobic filler of combination thereof. The total amount of filler present in the adhesives composition is generally from about 25% to 50% by weight of the adhesive composition. Desirably at least some portion of the filler is a carbon black. "Standard carbon black" is carbon black which is not specifically surface treated or oxidized to render it nonconductive. One or more nonconductive carbon blacks may be used in conjunction with the standard carbon black, although such inclusion may add unnecessary costs. The amount of carbon black in the composition is that amount which provides the desired color, viscosity, sag resistance and strength and generally is within the aforementioned range.

The carbon blacks depending on their structure may range over a wide range of structures as given by oil absorption number (ASTM D-2414-09). For example, the carbon black typically should be an oil absorption number (OAN) of about 80 to 200 ccs per 100 grams. Preferably, the oil absorption of the carbon is at least about 90, more preferably at least about 100, and most preferably at least about 110 to preferably at most about 180, more preferably at most about 165 and most preferably at most about 150 ccs/100 grams. In addition, the carbon black desirably has an iodine number that is at least 80. The iodine number is related to the surface area of the carbon black, but also to the presence of volatile species such as unsaturated oils and, sulfur containing compounds. The iodine number is determined using ASTM D1510-11.

Carbon blacks useful in the composition include, for example, RAVEN™ 790, RAVEN™ 450, RAVEN™ 500, RAVEN™ 430, RAVEN™ 420 and RAVEN™ 410 carbon blacks available from Colombian and CSX™ carbon blacks available from Cabot, and PRINTEX™ 30 carbon black available from Degussa. Nonconductive carbon blacks are well known in the art and include RAVEN™ 1040 and RAVEN™ 1060 carbon black available from Colombian.

Other fillers may also be used alone or in combination with carbon black. For example, other hydrophilic fillers may be used in combination with carbon black. A suitable hydrophilic filler is clay. Typically, the clay has a specific surface area of at least 5 $m^2/g$. Clays useful in the invention include kaolin, surface treated kaolin, calcined kaolin, aluminum silicates and surface treated anhydrous aluminum silicates. The clays can be used in any form which facilitates formation of the adhesive composition with the desired properties. Preferably, the clay is admixed in the form of pulverized powder, spray-dried beads or finely ground particles. It is also desirable for the clay to be calcined (heat treated to remove or reduce the hydrated water of the clay). An example of a suitable clay is Polestar 200R (IMERYS) with an average particle size of about 2 micrometers, and a BET surface of 8.5 $m^2/g$.

In a preferred embodiment, it may be advantageous to have an additional hydrophobic filler in combination with the hydrophilic filler. Hydrophobic fillers are fillers that have been hydrophobically modified. Modifications include coatings with organosilanes or fatty acids. "Hydrophobic filler" used herein is generally precipitated calcium carbonate with spherical morphology, coated with fatty acids. The coating level is approx. 1 to 5%. It has been discovered that the hydrophobic filler when present in a sufficient amount, may improve one or more properties such as the shear modulus obtained without loss in the impact resistance. Generally, the hydrophobic filler is present in an amount that is from greater than 0% to 50% by weight of the total amount of hydrophilic filler and hydrophobic filler (not including carbon black). Preferably, the amount is from 5%, 10% or 15% to 40% or 35%.

An example of a suitable hydrophobic filler is calcium carbonate that has been treated to render it hydrophobic, which is well known in the art. Hydrophobic calcium carbonates illustratively are typically treated/coated with organic acids or esters of organic acids to render them hydrophobic. Examples of suitable hydrophobic fillers include those available from Shiraishi Kogyo Kaisha LTD. under the tradename HAKEUNKA and M.P.I. Pharmaceutica GmBH, Hamburg, Germany. Another illustrative hydrophobic filler may be fumed silica such as those available from Wacker Chemie AG, Munich, Germany.

The adhesive also contains a catalyst which catalyzes the reaction of the hydrolysable silane moieties with water such as those known in the art. Exemplary catalysts include: titanic acid esters (e.g., tetrabutyl titanate and tetrapropyl titanate); organotin compounds (e.g., dibutyltin dilaurate, dibutyltin maleate, dibutyltin diacetate, tin octylate tin naphthenate, reaction products of dibutyltin oxide and phthalic acid esters, dialkyltin diacetyl acetonates such as, dibutyltin bis(acetylacetonate)). More preferably, the catalyst is a dialkyltin oxide; such as dibutyltin oxide; dialkyltin bisacetyl acetonate; or the reaction product of diakyltin oxide with a phthalic ester or pentanedione.

The catalyst is present in an amount of about 60 parts per million or greater based on the total weight of the adhesive composition, more preferably 120 parts by million or greater. The catalyst is present in an amount of about 2 percent or less based on the weight of the adhesive, more preferably 1.5 percent by weight or less, and most preferably 0.5 percent by weight or less.

The adhesive compositions of this invention may further comprise plasticizers so as to modify the rheological properties to a desired consistency. Such materials should be free of water, inert to isocyanate groups and compatible with a polymer. The compositions of the invention preferably comprise two plasticizers with one being a high polar plasticizer and one being a low polar plasticizer. A high polar plasticizer is a plasticizer with a polarity greater than the polarity of the aromatic diesters, such as the phthalate esters. A low polar plasticizer is a plasticizer which has a polarity the same as or less than the aromatic diesters.

Suitable high polar plasticizers include one or more of alkyl esters of sulfonic acid, alkyl alkylethers diesters, polyester resins, polyglycol diesters, polymeric polyesters, tricarboxylic esters, dialkylether diesters, dialkylether aromatic esters, aromatic phosphate esters, and aromatic sulfonamides. More preferred high polar plasticizers include aromatic sulfonamides, aromatic phosphate esters, dialkyl ether aromatic esters and alkyl esters of sulfonic acid. Most preferred high polar plasticizers include alkyl esters of sulfonic acid and toluene-sulfamide. Alkyl esters of sulfonic acid include alkylsulphonic phenyl ester available from Lanxess under the trademark MESAMOLL. Aromatic phosphate esters include PHOSFLEX™ 31 L isopropylated triphenyl phosphate ester, DISFLAMOLL™ DPO diphenyl-2-ethyl hexyl phosphate, and DISFLAMOL™ TKP tricresyl phosphate. Dialkylether aromatic esters include BENZOFLE™ 2-45 diethylene glycol dibenzoate. Aromatic sulfonamides include KETJENFLE™ 8 o and p, N-ethyl toluenesulfonamide.

Suitable low polar plasticizers include one or more aromatic diesters, aromatic triesters, aliphatic diesters, epoxidized esters, epoxidized oils, chlorinated hydrocarbons, aromatic oils, alkylether monoesters, naphthenic oils, alkyl monoesters, glyceride oils, parraffinic oils and silicone oils. Preferred low polar plasticizers include alkyl phthalates, such as diisononyl phthalates, dioctylphthalate and dibutyl-phthalate, partially hydrogenated terpene commercially available as "HB-40", epoxy plasticizers, chloroparaffins, adipic acid esters, castor oil, toluene and alkyl naphthalenes. The most preferred low polar plasticizers are the alkyl phthalates.

The amount of low polar plasticizer in the adhesive composition is that amount which gives the desired rheological properties and which is sufficient to disperse the catalyst in the system. The amounts disclosed herein include those amounts added during preparation of the prepolymer and during compounding of the adhesive. Preferably, low polar plasticizers are used in the adhesive composition in an amount of about 5 parts by weight or greater based on the weight of the adhesive composition, more preferably about 10 parts by weight or greater, and most preferably about 18 parts by weight or greater. The low polar plasticizer is preferably used in an amount of about 40 parts by weight or less based on the total amount of the adhesive composition, more preferably about 30 parts by weight or less and most preferably about 25 parts by weight or less.

The amount of high polar plasticizer in the adhesive composition is that amount which gives the desired rheological properties and the acceptable sag and string properties. Preferably, the high polar plasticizers are used in the adhesive composition in an amount of about 0.2 parts by weight or greater based on the weight of the adhesive composition, more preferably about 0.5 parts by weight or greater, and most preferably about 1 part by weight or greater. The high polar plasticizer is preferably used in an amount of about 20 parts by weight or less based on the total amount of the adhesive composition, more preferably about 12 parts by weight or less and most preferably about 8 parts by weight or less.

The adhesive composition of this invention may further comprise stabilizers, which function to protect the adhesive composition from moisture, thereby inhibiting advancement and preventing premature crosslinking of the silyl terminated prepolymers in the adhesive composition. Stabilizers known to the skilled artisan for moisture curing adhesives may be used. Included among such stabilizers are diethylmalonate, alkylphenol alkylates, paratoluene sulfonic isocyanates, benzoyl chloride and orthoalkyl formates. Such stabilizers are preferably used in an amount of about 0.1 parts by weight or greater based on the total weight of the adhesive composition, preferably about 0.5 parts by weight or greater and more preferably about 0.8 parts by weight or greater. Such stabilizers are used in an amount of about 5.0 parts by weight or less based on the weight of the adhesive composition, more preferably about 2.0 parts by weight or less and most preferably about 1.4 parts by weight or less.

The adhesive composition may further comprise a hydrophilic material that functions to draw atmospheric moisture into the composition. This material enhances the cure speed of the formulation by drawing atmospheric moisture to the composition. Preferably, the hydrophilic material is a liquid. Among preferred hydroscopic materials are pyrolidinones such as 1 methyl-2-pyrolidinone, available from under the trademark M-PYROL. The hydrophilic material is preferably present in an amount of about 0.1 parts by weight or greater and more preferably about 0.3 parts by weight or greater and preferably about 1.0 parts by weight or less and most preferably about 0.6 parts by weight or less.

Other components commonly used in adhesive compositions may be used in the composition of this invention. Such materials include those known in the art and may include ultraviolet stabilizers and antioxidants and the like.

As used herein, all parts by weight relative to the components of the adhesive composition are based on 100 total parts by weight of the adhesive composition.

The adhesive composition of this invention may be formulated by blending the components together using means well known in the art. Generally, the components are blended in a suitable mixer. Such blending is preferably conducted in an inert atmosphere in the absence of oxygen and atmospheric moisture to prevent premature reaction. In embodiments, it may be advantageous to add any plasticizers to the reaction mixture for preparing the silane modified prepolymer so that such mixture may be easily mixed and handled. Alternatively, the plasticizers can be added during blending of all the components. Once the adhesive composition is formulated, it is packaged in a suitable container such that it is protected from atmospheric moisture and oxygen. Contact with atmospheric moisture and oxygen could result in premature crosslinking of the silane modified prepolymer.

The adhesive composition of the invention may be used to bond a variety of substrates together as described hereinbefore. The composition can be used to bond porous and nonporous substrates together. The adhesive composition is applied to a substrate and the adhesive on the first substrate is thereafter contacted with a second substrate. In preferred embodiments, the surfaces to which the adhesive is applied are cleaned and primed prior to application, see for example, U.S. Pat. Nos. 4,525,511; 3,707,521 and 3,779,794; relevant parts of all are incorporated herein by reference. Generally, the adhesives of the invention are applied at ambient temperature in the presence of atmospheric moisture. Exposure to atmospheric moisture is sufficient to result in curing of the adhesive. Curing can be accelerated by the addition of additional water or by applying heat to the curing adhesive by means of convection heat, microwave heating and the like. Preferably, the adhesive of the invention is formulated to provide a working time of about 6 minutes or greater, and more preferably about 12 minutes or greater. Preferably, the working time is about 60 minutes or less and more preferably about 30 minutes or less.

The adhesive composition is preferably used to bond glass or plastic coated with an abrasion resistant coating, to other substrates such as bare or painted metals or plastics. In a preferred embodiment, the first substrate is a glass, or plastic coated with an abrasion resistant coating, and the second substrate is a window frame. In another preferred embodiment, the first substrate is a glass, or plastic coated with an abrasion resistant coating, and the second substrate is a window frame of an automobile. Preferably, the glass window is cleaned and has a glass primer applied to the area to which the adhesive is to be bonded. The plastic coated with an abrasion resistant coating can be any plastic which is clear, such as polycarbonate, acrylics, hydrogenated polystyrene or hydrogenated styrene conjugated diene block copolymers having greater than 50 percent styrene content. The coating can comprise any coating which is abrasion resistant such as a polysiloxane coating. Preferably, the coating has an ultraviolet pigmented light blocking additive. Preferably, the glass or plastic window has an opaque coating disposed in the region to be contacted with the adhesive to block UV light from reaching the adhesive.

In a preferred embodiment, the composition of the invention is used to replace windows in structures or vehicles and most preferably in vehicles. The first step is removal of the previous window. This can be achieved by cutting the bead of the adhesive holding the old window in place and then removing the old window. Thereafter, the new window is cleaned and primed. The old adhesive that is located on the window flange can be removed, although it is not necessary and in most cases it is left in place. The window flange is preferably primed with a paint primer. The adhesive is applied in a bead to the periphery of the window located such that it will contact the window flange when placed in the vehicle. The window with the adhesive located thereon is then placed into the flange with the adhesive located between the window and the flange. The adhesive bead is a continuous bead that functions to seal the junction between the window and the window flange. A continuous bead of adhesive is a bead that is located such that the bead connects at each end to form a continuous seal between the window and the flange when contacted. Thereafter the adhesive is allowed to cure.

In another embodiment, the compositions of the invention can be used to bond modular components together. Examples of modular components include vehicle modules, such as door, window or body.

Illustrative Embodiments of the Invention

The following examples are provided to illustrate the invention, but are not intended to limit the scope thereof. All parts and percentages are by weight unless otherwise indicated.

Test Methods

Viscosity: Resin viscosity (SMP prior to curing) was measured at 23° C. using a Brookfield viscometer employing a #6 spindle at 12 rpm.

Preparation of test samples: 50 grams of resin was collected and 0.25 grams of U220 tin catalyst was added. The sample was mixed using a high speed mixer for 1 minute and drawn down films were prepared on a propylene sheet at 25 mil thickness. The sample was allowed to cure at ambient condition (about 25° C./50% relative humidity) until fully cured (up to 7-10 days). Samples were cut in dogbone shapes for physical properties testing.

The physical properties of the cured SMP and the related sealants were tested according to American Society for Testing and Materials (ASTM) Method D 412 for physical properties such as tensile strength at break, elongation at break and modulus at 100% elongation (Secant Modulus=to modulus "slope" of line from the origin to 100% elongation in the stress/strain curve).

The cure time or residual tack of the cured systems was observed by finger touch and time was measured where no residual tack was observed.

Example 1

Silane Precursor Preparation

In a glass reactor 20.6 grams of Silquest 2120 was added and 16.2 grams of methyl acrylate was added drop wise, an exotherm was observed. Material was reacted for 4 hours at room temperature (i.e., without further heating and under dry conditions). NMR confirmed that the reaction product was essentially comprised of the following silane precursor compounds:

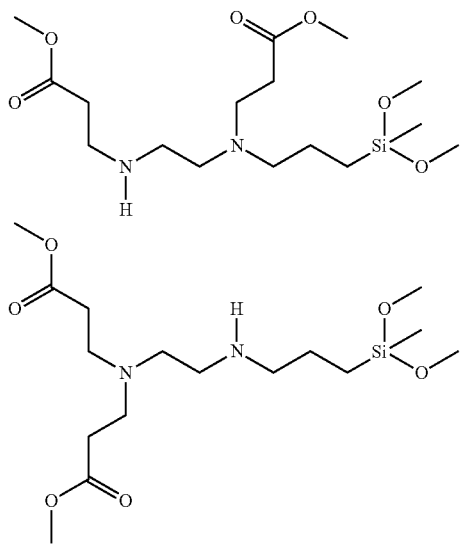

Isocyanate Terminated Prepolymer Preparation

In a glass reactor 1200 grams of Acclaim 8200 diol (OH #13.2, $H_2O$ det=0.038%,) was added and heated to 50° C. for 15 minutes. 75 grams of Isonate 125M (MDI) was added and mixed well at 50° C. then 0.01 grams of Dabco T-9 catalyst was added into the mixture and an exotherm was observed. The reaction was allowed to continue for 2 hours at 50° C. The products were then cooled and stored under a dry atmosphere. The isocyanate terminated prepolymer had a free % NCO of about 0.86% as measured by Karl Fisher titration.

Silane Modified Prepolymer Preparation 42.5 grams of the silane precursor compound was dropwise added to the above isocyanate terminated prepolymer. The reaction was carried out at room temperature (~23° C.) for 15 minutes until the isocyanated terminated prepolymer was fully capped by the silane precursor compound. The silane modified prepolymer had essentially no detectable NCO groups as determined by Karl Fisher titration. The viscosity of the silane modified prepolymer was 12000 centipoise measured at 23° C. at a rpm of 12 and using a number 6 spindle in a Brookfield viscometer.

The cured properties (silane modified polymer) and curing time of the silane modified prepolymer is shown in Table 1 along with commercially available silane modified polymers of Comparative Examples 1 and 2 described below.

Comparative Examples 1 and 2

Comparative Example 1 is a silane modified polymer (SMPs) shown in Table 1 and further described below. The SMP used in Comparative Example 1 was MS Polymer 203H available from Kaneka North America LLC., Pasadena, Tex. This SMP is based on a triol having a molecular weight of 10,000-12000 g/mol. This resin prior to curing has a very low viscosity. The SMP used in Comparative Example 2 was SPUR 1015LM available from Momentive Performance Materials Inc., Columbus, Ohio. It is a trimethoxysilyl terminated polyurethane prepolymer. It's based on 10,000-12,000 molecular weight polyol reacted with isocyanatosilane and resin is free of plasticizer.

From Table 1, it is clear that the silane modified polymer of this invention realizes an excellent combination of cure time with properties for a moisture cured silane terminated polymer. In addition, it has been discovered that the silane modified polymer of this invention has improved compatibility with typical plasticizers (e.g., phthalates), which is believed to be due in part to the presence of multiple alkyl esters grafted on to the backbone of the polymer.

TABLE 1

| Property | Comp. Ex. 1 | Comp. Ex. 2 | Example 1 |
| --- | --- | --- | --- |
| Secant Modulus (psi) | 23 | 26 | 29 |
| Elongation at Break (%) | 393 | 177 | 295 |
| Tensile strength (psi) | 60 | 40 | 67 |
| Cure time (hr) | 5 | 1.5 | 3.5 |
| Viscosity (Pa · s) | 10 | 54 | 15 |

Adhesives made from the silane modified polymer of this invention may be useful for bonding glass such as windshields into car bodies or buildings require multiple at times contradicting characteristics, such as the ability to easily dispense, but maintain the dispensed shape (bead), high strength, but be sufficiently elastomeric to cushion the brittle glass from vibration, sufficient working time to dispense the bead, but quick curing or tack free time to allow for quick drive away of a repaired vehicle.

What is claimed is:

1. A method of forming a silane modified polymer comprising:
   preparing a silane precursor compound by a) providing an organic compound having a backbone that is terminated by an amino group having at least one active amino hydrogen and a hydrolysable silane, wherein the backbone is comprised of at least one secondary amino group having one active amino hydrogen,
   b) providing a Michael addition acceptor compound, wherein the Michael addition acceptor compound fails to have a group reactive with an isocyanate group, and
   c) reacting the organic compound with the Michael addition acceptor compound to form the silane precursor compound, the silane precursor compound having one tertiary amino group and one secondary amino group; and
   d) reacting an excess of the silane precursor compound with an isocyanate terminated prepolymer comprised of a polyether backbone to prepare a silane modified polymer containing no isocyanate groups.

2. The method of claim 1, wherein the organic compound has the structure

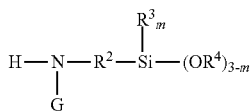

where G is an organic group or hydrogen, $R^2$ is a —$(CH_2)_O$—NH—$(CH_2)_P$, in which o and p are identical or different and equal to 2 to 6, $R^3$ is a linear or branched alkyl residue having 1 to 6 carbon atoms, $R^4$ is a linear or branched alkyl residue having 1 to 4 carbon atoms and m is equal to 0, 1 or 2.

3. The method of claim 2, wherein G is hydrogen.

4. The method of claim 2, wherein the Michael addition acceptor compound is an acrylate ester.

5. The method of claim 4, wherein the acrylate ester is methyl acrylate, ethyl acrylate, n-butyl acrylate, tert-butyl acrylate, methyl methacrylate, ethyl methacrylate, n-butyl methacrylate, tert-butyl acrylate or mixture thereof.

6. The method of claim 2, wherein m is equal to 1 or 2.

7. The method of claim 6, wherein m is equal to 1.

8. The method of claim 2, wherein the organic compound is N(beta-aminoethyl) gamma aminopropylmethyldimethoxy-silane, N(beta-aminoethyl) gamma aminopropyltriethoxy-silane or mixture thereof.

9. The method of claim 1, wherein the silane modified polymer is comprised of:

Q-(L)$_z$ wherein Q is a residue of an isocyanate terminated polyether prepolymer having a valency of z, z being equal to 2 or 3, and L being independently,

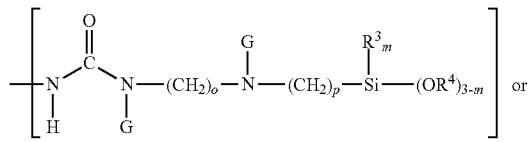

-continued

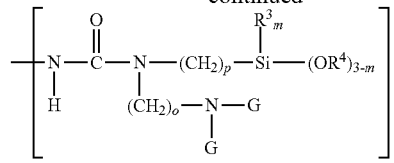

wherein G is an alkyl ester having 3 to 10 carbons, $R^3$ is a linear or branched alkyl having 1 to 6 carbon atoms, $R^4$ is a linear or branched alkyl having 1 to 4 carbon atoms and m is equal to 0, 1 or 2, and o and p are identical or different and equal to 2 to 6.

10. The method of claim 9, wherein z is 2.

11. An adhesive composition comprising: a silane modified prepolymer prepared according to claim 1; and one or more fillers wherein at least some portion of the fillers comprise carbon black;
   wherein the silane modified polymer corresponds to the formula:

Q-(L)$_z$ wherein Q is a residue of an isocyanate terminated polyether prepolymer having a valency of z, z being equal to 2 or 3, and L being independently,

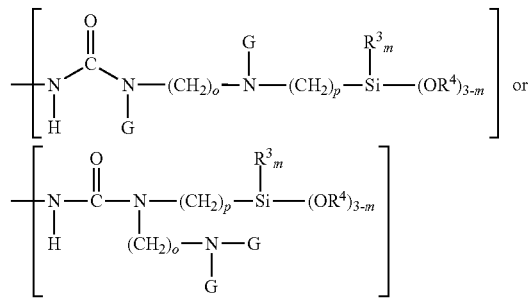

wherein G is an alkyl ester having 3 to 10 carbons, $R^3$ is a linear or branched alkyl having 1 to 6 carbon atoms, $R^4$ is a linear or branched alkyl having 1 to 4 carbon atoms and m is equal to 0, 1 or 2, and o and p are identical or different and equal to 2 to 6; and
   wherein the polyether backbone of the isocyanate terminated polymer is a polyoxyalkylene oxide capped with about 3 percent by weight or less of ethylene oxide.

12. The adhesive composition of claim 11, wherein the composition is further comprised of a plasticizer.

13. The adhesive composition according to claim 11 wherein the backbone of the isocyanate terminated prepolymer is linear.

14. An adhesive composition comprising: a silane modified polymer prepared according to claim 1; and one or more fillers wherein at least some portion of the fillers comprise carbon black;
   wherein the silane modified polymer corresponds to the formula:

Q-(L)$_z$ wherein Q is a residue of an isocyanate terminated polyether prepolymer having a valency of z, z being equal to 2 or 3, and L being independently,

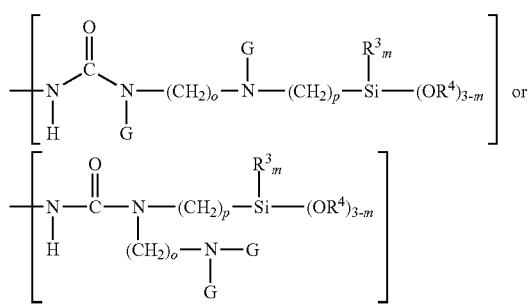

wherein G is an alkyl ester having 3 to 10 carbons, $R^3$ is a linear or branched alkyl having 1 to 6 carbon atoms, $R^4$ is a linear or branched alkyl having 1 to 4 carbon atoms and m is equal to 0, 1 or 2, o and p are identical or different and equal to 2 to 6; and wherein the backbone of the isocyanate terminated prepolymer is prepared from a mixture of diols and triols wherein the diols are from 0.8 to 0.98 percent by weight of the mixture.

15. The method of claim 1 wherein a ratio of amine equivalents of the silane precursor compound to equivalents of isocyanate groups of the isocyanate terminated prepolymer is from 1.01:1.0 to 1.2 to 1.0.

16. The method according to claim 1 wherein the polyether backbone is a polyoxyalkylene oxide capped with about 3 percent by weight of ethylene oxide.

17. The method composition according to claim 1 wherein the backbone of the isocyanate terminated prepolymer is linear.

18. The method composition according to claim 1 wherein the backbone of the isocyanate terminated prepolymer is prepared from a mixture of diols and triols wherein the diols are from 0.8 to 0.98 percent by weight of the mixture.

19. The adhesive composition according to claim 14 wherein the backbone of the isocyanate terminated prepolymer is linear.

20. The adhesive composition of claim 14, wherein the composition is further comprised of a plasticizer.

* * * * *